(12) United States Patent
Noro et al.

(10) Patent No.: US 7,885,743 B2
(45) Date of Patent: Feb. 8, 2011

(54) ELECTRIC MIRROR CONTROL DEVICE AND ELECTRIC MIRROR CONTROL METHOD (75) Inventors: Yoshiki Noro, Wako (JP); Kenji Shioiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 414 days.

(21) Appl. No.: 12/113,545

(22) Filed: May 1, 2008

(65) Prior Publication Data
US 2008/0278786 A1 Nov. 13, 2008

(30) Foreign Application Priority Data
May 8, 2007 (JP) .............................. 2007-123238

(51) Int. Cl.
*G05D 3/00* (2006.01)
(52) U.S. Cl. ...................... 701/49; 318/652; 318/663; 318/664; 318/665; 318/666; 359/843; 359/871; 359/874; 359/876; 359/877; 73/1.75; 73/1.79; 702/88; 702/90; 702/150; 702/151
(58) Field of Classification Search .................. 701/49; 318/652–670; 359/843, 871–877; 73/1.75, 73/1.79, 1.81; 702/88, 90, 91, 150–154
See application file for complete search history.

(56) References Cited
U.S. PATENT DOCUMENTS 4,818,090 A * 4/1989 Righi .......................... 359/874
6,469,527 B1 * 10/2002 Gardner ....................... 324/714

FOREIGN PATENT DOCUMENTS
JP 2003-200783 7/2003

* cited by examiner

*Primary Examiner*—Thomas G Black
*Assistant Examiner*—Peter D Nolan
(74) *Attorney, Agent, or Firm*—Rankin, Hill & Clark LLP (57) ABSTRACT An electric mirror control device provided with a proportionality constant conversion means for converting the proportionality constant of a detection output voltage to the angle of a mirror surface to be positive or negative. When an up-down sensor and a right-left sensor for detecting the angle of the mirror surface have a plurality of specifications, each of which has a different proportionality constant of the detection output voltage to the angle of the mirror surface, controller determines the specification of the angle sensors based on whether the proportionality constant of the detection output voltage output via the proportionality constant conversion means is positive or negative, and controls an up-down motor or a right-left motor in accordance with the determined specification stored in advance.

5 Claims, 5 Drawing Sheets

VOLTAGE CHANGE
DURING REVERSE INTERLOCKING OPERATION

VOLTAGE CHANGE
DURING REVERSE INTERLOCKING OPERATION

VOLTAGE CHANGE
DURING REVERSE INTERLOCKING OPERATION

ELECTRIC MIRROR CONTROL DEVICE AND ELECTRIC MIRROR CONTROL METHOD

CROSS REFERENCE TO RELATED APPLICATIONS

This application claims the foreign priority benefit under 35 U.S.C. §119 of Japanese Patent Application No. 2007-123238 filed on May 8, 2007, the disclosure of which is incorporated herein by reference.

BACKGROUND OF THE INVENTION

1. Field of the Invention

The present invention relates to an electric mirror control device and an electric mirror control method that automatically tilt the mirror surface of a door mirror when a vehicle goes back so that a driver can easily check a road at the rear side of the vehicle.

2. Description of the Related Art

A back mirror device for a door mirror or a fender mirror of an automobile is configured such that only when a switch for controlling a mirror is operated, a direct current motor for controlling a mirror surface is activated to change the angle of the mirror surface in the right-left direction and the up-down direction.

The mirror surface can be tilted in various directions from a center supporting point provided at the back of the mirror surface. More specifically, a pivot axis provided to either the right or left of the center supporting point and another pivot axis provided to either upper part or lower part of the center supporting point are moved forward or backward to change the angle of the mirror surface in the right-left direction and the up-down direction. Accordingly, the mirror surface can be tilted in any direction in combination of the right-left angle change and the up-down angle change.

Each of the pivot axes for the right-left angle and the up-down angle is moved forward or backward by a different direct current motor, and the only motor whose switch is operated is driven to adjust the angle of the mirror surface in the direction controlled by the motor.

In addition to the above mechanism adjusting a mirror surface by a switch operation, some outer door mirrors are further provided with a mechanism that automatically tilts down a mirror surface at a predetermined angle set in advance when the transmission is shifted to the reverse, and tilts up the mirror surface to the position before the mirror surface was tilted down when the transmission is shifted to another position, such as the drive position, from the reverse.

When a driver drives his or her automobile backward into a garage, it is preferable that the driver is allowed to check an area around the rear wheels rather than an area right behind the automobile to eliminate blind spots. Thus, a back mirror device is configured to tilt down the mirror surface when the transmission is in reverse and to return automatically the mirror surface to the position before it was tilted down when the transmission is shifted to any position other than the reverse. This mechanism is configured in such a manner that the motor of two motors which changes the up-down angle is rotated to tilt down the mirror surface in a predetermined amount when the transmission is in the reverse, and is rotated to tilt up the mirror surface in the same amount when transmission is shifted to a position other than reverse.

In conventional electric mirror control devices, a target tilt-down angle to which an outer door mirror is tilted down is set in advance, each of an up-down angle and a right-left angle is detected by a sensor, the mirror surface is tilted down until the output voltage of the sensor reaches the sensor output voltage value corresponding to the target angle when the mirror surface is tilted down, and the mirror surface is tilted up until the output voltage of the sensor returns to the sensor output voltage value before the mirror surface is tilted down. When the outer door mirror is tilted down, a feed forward control is performed on the sensor value (as disclosed in JP Unexamined Patent Publication (Kokai) No. 2003-200783).

In such a outer door mirror described above, when sensors provided by different manufactures are used for the purpose of reducing cost, the control device has to be adjusted in accordance with each of the sensor specifications of the different manufactures.

Figure 6:
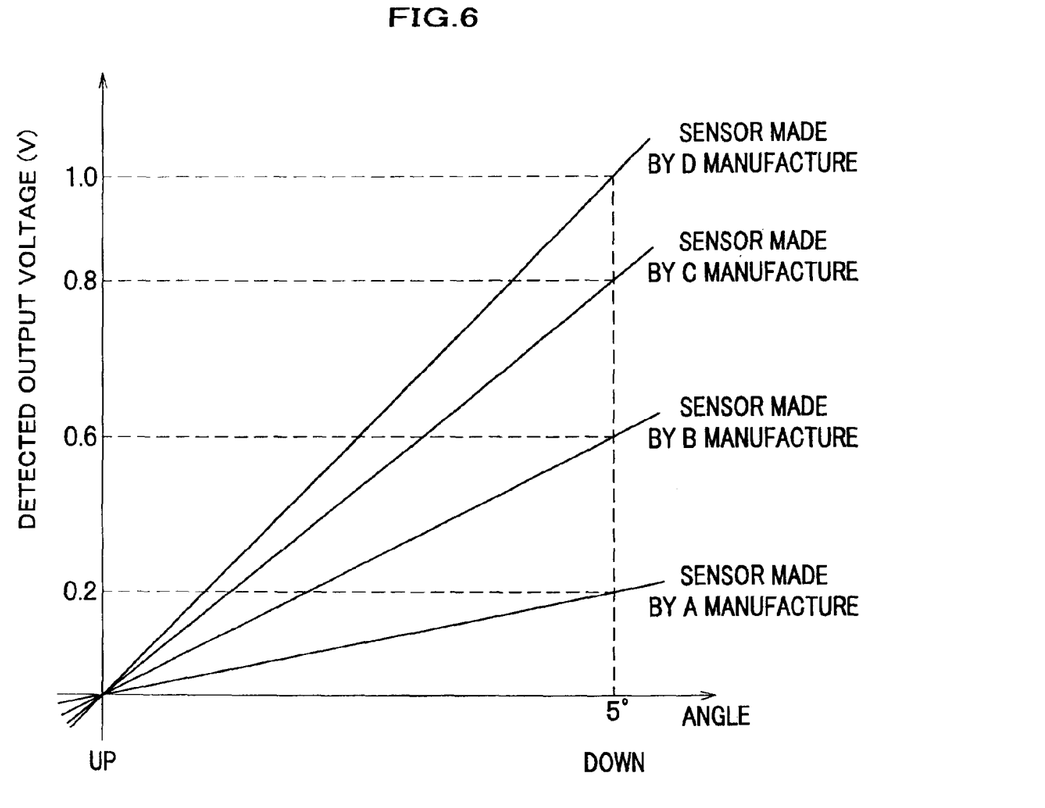
FIG. 6 is a graph showing the difference of detection output voltages output by sensors with different specifications when the sensors detect the same angular change.

FIG. 6 is a graph showing the difference of detection output voltages output when the same angular change is detected by sensors with different specifications.

As shown in this graph, the sensor made by the manufacturer A outputs 0.2V for the angle change of 5 degrees, and the sensor made by the manufacturer B outputs 0.5V for the same angle change while the sensor made by the manufacturer D outputs 1.0V for the same angle change.

Thus, there has been a problem that when sensor specifications are different, the control device has to be adjusted in accordance with each sensor specification.

Moreover, the different sensor specifications can be mixed up so that the control device may be adjusted or installed wrongfully if sensor specifications of the manufactures have a similar proportionality constant.

SUMMARY OF THE INVENTION

The present invention is made in view of the above problem, and an object thereof is to provide an electric mirror control device and an electric mirror control method that can automatically differentiate the difference of a plurality of specifications of sensors correctly so that a mirror surface is tilted correctly.

A first aspect of the present invention provides an electric mirror control device including an angle sensor for detecting an angle of a mirror surface; a control device for controlling a motor-drive unit that tilts the mirror surface and changes the angle of the mirror surface based on a detection output voltage of the angle sensor, wherein the angle sensor having a plurality of specifications each of which has a different proportionality constant of the detection output voltage corresponding to the angle of the mirror surface; and a proportionality constant conversion unit for converting the proportionality constants, the control device including an angle-sensor-specification determining function for determining a specification of the angle sensor based on whether the proportionality constant of the detection output voltage output via the proportionality constant conversion unit is positive or negative, a specification-by-specification control function for controlling the motor-drive unit in accordance with the specification of the angle sensor determined from the plurality of specifications stored in advance by the angle sensor determining function.

In the aforementioned electric mirror control device, the angle sensor outputs separately a first detection output voltage for detecting an up-down angle of the mirror surface and a second detection output voltage for detecting a right-left angle of the mirror surface, and the angle-sensor-specification determining function determines the specification of the angle sensor based on whether the proportionality constant of the first detection output voltage to the up-down angle is positive or negative, or the proportionality constant of the second detection output voltage to the right-left angle is positive or negative.

In the aforementioned electric mirror control device, the control device comprises a reverse interlocking function that allows the motor-drive unit to automatically tilt down the mirror surface when a transmission of a vehicle is shifted to a reverse position and to return the mirror surface to a position before the mirror surface is tilted down when the transmission of the vehicle is shifted to any position other than the reverse position, and the angle-sensor-specification determining function determines the specification of the angle sensor based on whether the proportionality constant of the detection output voltage of the angle sensor is positive or negative when the transmission is shifted to the reverse position and the mirror surface is tilted down.

A second aspect of the present invention provides an electric mirror control method for an electric mirror control device including an angle sensor for detecting an angle of a mirror surface and a control device for controlling a motor-drive unit that tilts the mirror surface and changes the angle of the mirror surface based on a detection output voltage of the angle sensor. The method including steps of: a first step of setting a proportionality constant of the detection output voltage corresponding to the angle of the mirror surface positive or negative in accordance with a type of the angle sensor; a second step of performing a reverse interlocking operation that tilts down the angle of the mirror surface when a transmission of a vehicle is shifted to a reverse position and outputting the detection output voltage which detects the angle of the mirror surface; a third step of determining a specification of the angle sensor based on whether the proportionality constant of the detection output voltage output during the second step is positive or negative; and a fourth step of controlling the motor-drive unit in accordance with the specification of the angle sensor determined at the third step from a plurality of specifications of the angle sensor stored in advance.

Other features and advantages of the present invention will become more apparent from the following detailed descriptions of the invention when taken in conjunction with the accompanying drawings.

DETAILED DESCRIPTION OF THE INVENTION

Preferred embodiment of an electric mirror control device and an electric mirror control method according to the present invention is described below with reference to the accompanying drawings.

Figure 1:
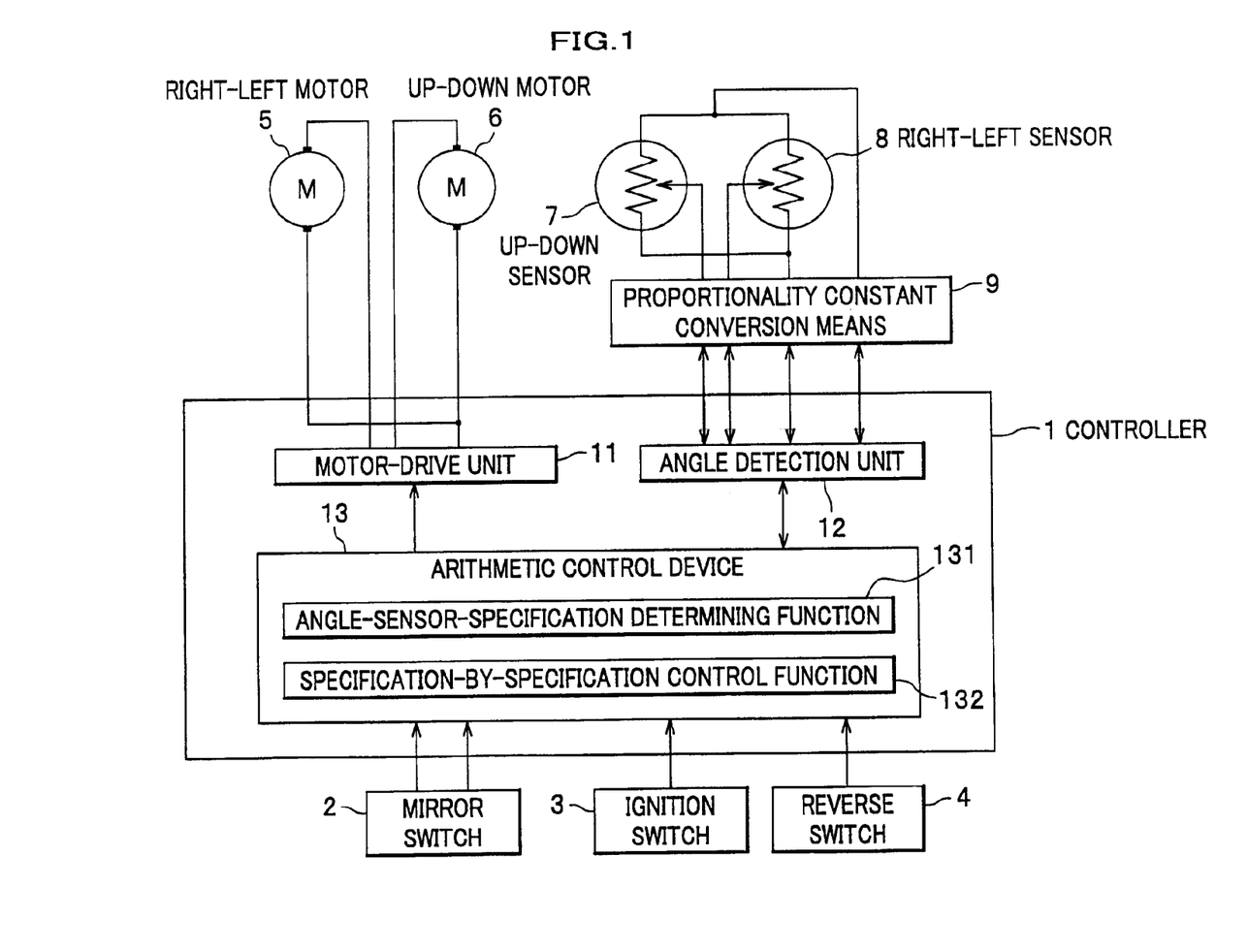
FIG. 1 is a block diagram showing a configuration of a controller (control means) of an electric mirror control device according to the present invention and peripheral devices of the controller.

FIG. 1 is a block diagram showing a configuration of a controller (control means) of an electric mirror control device according to the embodiment and peripheral devices of the controller.

Electricity is supplied to a controller 1 by an ignition switch 3 as shown in FIG. 1. When a mirror switch 2 is operated, the mirror switch 2 transmits signals to an arithmetic control unit 13. The arithmetic control unit 13 controls a motor-drive unit 11 in response to the signals from the mirror switch 2. The motor-drive unit 11 then drives a right-left motor 5 and an up-down motor 6 (drive means) under the control of the arithmetic control unit 13 to tilt the mirror surface of an outer door mirror from right to left or up and down to form a mirror surface angle desired by a driver.

When a gear shift is moved into a reverse position, a reverse switch 4 is also switched on and the arithmetic control unit 13 controls the motor-drive unit 11 to drive the up-down motor 6 to tilt down the mirror surface of the outer door mirror and to stop the up-down motor 6 when a value of an up-down sensor 7, which is changed as the up-down motor 6 is driven, reaches a predetermined value. This makes it easier for a driver to visually check a road at the rear of a vehicle or the position of a wheel stopper and the like when the vehicle is rolled back, for example, into a garage.

When the gear shift is returned from the reverse position into the forward position, for example, the reverse switch 4 is also switched off and the arithmetic control unit 13 controls the motor-drive unit 11 to drive the up-down motor 6 to return the original angle of the mirror surface to the angle before the gear shift is set into the reverse position.

The series of operations carried out as described above when the gear shift is set into the reverse position and then returned to the forward position or the like are referred to as a "reverse interlocking operation" hereinafter.

Detection output voltage output form the up-down sensor 7 and a right-left sensor 8 is input via a proportionality constant conversion means 9 to an angle detection unit 12 in the controller 1, whereby the detection output voltage is converted into an detected angle in accordance with the specification of the up-down sensor 7 and the right-left sensor 8.

The up-down sensor 7 and the right-left sensor 8 are composed of a potentiometer made of a resistance and a moving contact that moves along the resistance in accordance with the mirror surface angle of an outer door mirror. In the potentiometer, when constant voltage is applied to the ends of the resistance, voltage corresponding to the up-down angle or the right-left angle of the mirror surface is output from the moving contact. Proportionality constants of the detection output voltage to the angle of the mirror surface angle vary according to specifications of sensor manufactures.

If using sensors provided by different manufactures, there has been a problem that unless specifications of sensors are correctly judged, an outer mirror is tilted at a wrong angle and the reverse interlocking operation is not performed correctly.

The present invention solves the problem by automatically determining specifications of sensors correctly and absorbing the specification differences of sensors made by different manufactures.

First Embodiment

Figure 2A:
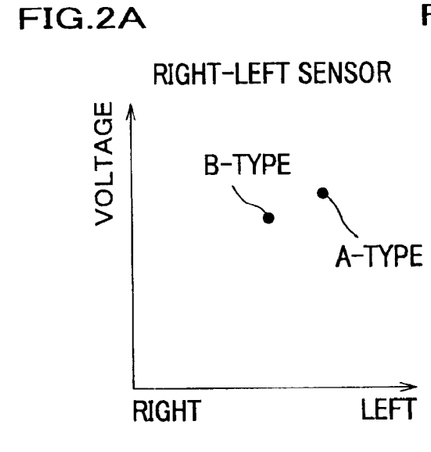
FIGS. 2A and 2B show change in sensor output voltage in a reverse interlocking operation in a first embodiment of the present invention.
Figure 2B:
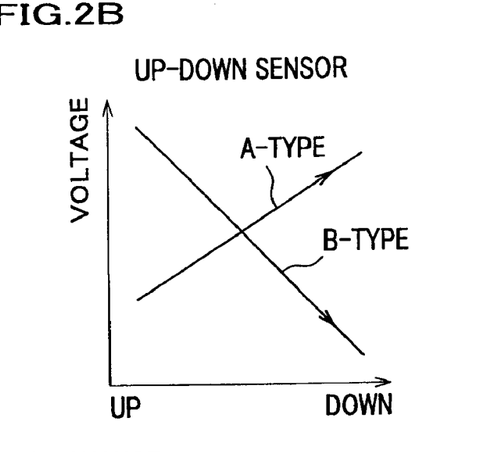

FIGS. 2A and 2B show change in sensor output voltages in the reverse interlocking operation in a first embodiment of the present invention. FIG. 2A shows sensor output voltages of the right-left sensor 8, and FIG. 2B shows those of the up-down sensor 7. In the first embodiment, sensors of the same type are used for the up-down sensor 7 and the right-left sensor 8.

In the first embodiment, two sensors with different specifications are set as an A-type and as a B-type, as shown in FIG. 2B. In the A-type sensor, the detection output voltage output from the moving contact of the up-down sensor 7 increases when a mirror surface is tilted down by the reverse interlocking operation. In the B-type sensor, the detection output voltage output from the moving contact of the up-down sensor 7 decreases when a mirror surface is tilted down by the reverse interlocking operation. This setting makes it possible to determine whether the sensor used is the A-type sensor or the B-type sensor by judging whether the detection output voltage output during the reverse interlocking operation increases or decreases.

The setting is realized by reversing the polarity of voltage applied to the ends of the resistance of the potentiometer of the sensor by using the proportionality constant conversion means 9, or providing the sensor with a setting function.

With the above setting, an angle-sensor-specification determining function 131 of the arithmetic control unit 13 of the controller 1 can differentiate the two types of sensors correctly only by judging whether the detection output voltage is changed in positive direction or negative direction.

After automatically differentiating the two types of the sensor as described above, a specification-by-specification control function 132 of the arithmetic control unit 13 controls the angular of a mirror surface by using a specification of the detected sensor type stored in a storage means in advance. In the first embodiment, the two types of sensors can be differentiated by using the only up-down sensor 7, and thus the sensor output voltage of the right-left sensor 8 shown in FIG. 2A does not when determining only two types of sensors.

In the first embodiment of the present invention, because the controller 1 automatically determines the specification of the sensor, the controller 1 may be used in an outer door mirror having two types of sensors without the need to set the controller 1 in accordance with each specification of the two types of sensors, whereby prevention measures for misplacement are not necessary, and thus the production cost is reduced.

Second Embodiment

Figure 3A:
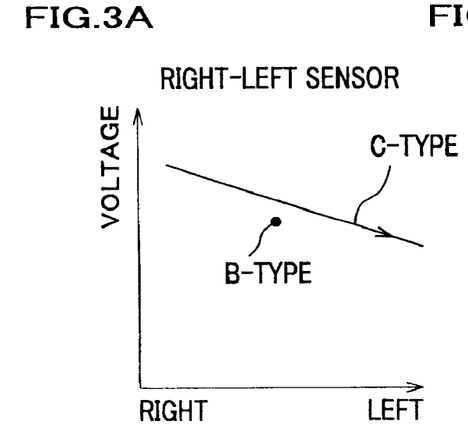
FIGS. 3A and 3B show change in sensor output voltage during the reverse interlocking operation in a second embodiment of the present invention.
Figure 3B:
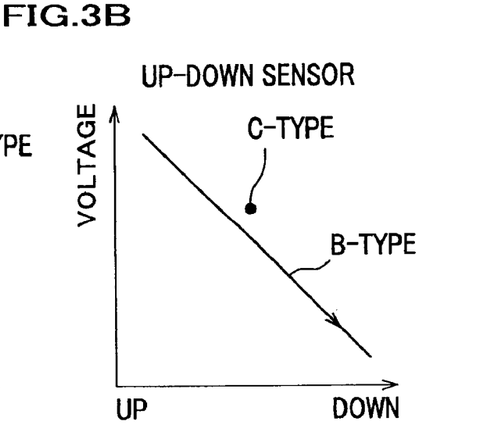

FIGS. 3A and 3B show change in sensor output voltages during the reverse interlocking operation in a second embodiment of the present invention. FIG. 3A shows the sensor output voltage of the right-left sensor 8. FIG. 3B shows the sensor output voltage of the up-down sensor 7.

In the second embodiment of the present invention, two sensors with different specifications are set to be a B-type and a C-type as shown in FIG. 3B. In the B-type sensor, the detection output voltage output from the moving contact of the up-down sensor 7 decreases when a mirror surface is tilted down by the reverse interlocking operation. In the C-type sensor, the detection output voltage output from the moving contact of the right-left sensor 8 decreases when the mirror surface is tilted down by the reverse interlocking operation as shown in FIG. 3A. This setting makes it possible to differentiate the types of a sensor used by determining which one of the sensor detection output voltages of the up-down sensor 7 and the right-left sensor 8 decreases during the reverse interlocking operation.

The setting is realized by reversing the polarity of voltage applied to the ends of the resistance of the potentiometer of the sensor by using the proportionality constant conversion means 9, or by reversing the polarity of the input terminal of the arithmetic control device or the polarity of the output terminal of a potentiometer.

In the second embodiment, the detection output voltage output from the B-type sensor used for the up-down sensor 7 is set to decrease during the reverse interlocking operation, and the detection output voltage output from the C-type sensor used for the right-left sensor 8 is set to decrease during the reverse interlocking operation.

With this setting, the angle-sensor-specification determining function 131 of the arithmetic control unit 13 of the controller 1 can differentiate two types of sensors only by judging which one of the sensor detection output voltages of the up-down sensor 7 and the right-left sensor 8 decreases.

After automatically differentiating the types of the sensor used as described above, the specification-by-specification control function 132 of the arithmetic control unit 13 controls the angle of the mirror surface by using a specification of the detected sensor type stored in a storage means in advance.

In the second embodiment of the present invention, because the controller 1 automatically determines the specification of the sensor, the controller 1 can be used in an outer door mirror having two types of sensors without the need to set the controller 1 in accordance with each specification of the two types of sensors, whereby prevention measures for misplacement are not necessary, and thus the production cost is reduced.

In the two embodiments described above, because each proportionality constant of the up-down sensor 7 and the right-left sensor 8 can be set to be positive or negative, maximum of four types of the up-down sensor 7 and the right-left sensor 8, each of which has a different specification, can be differentiated.

Figures 4A, 4B:
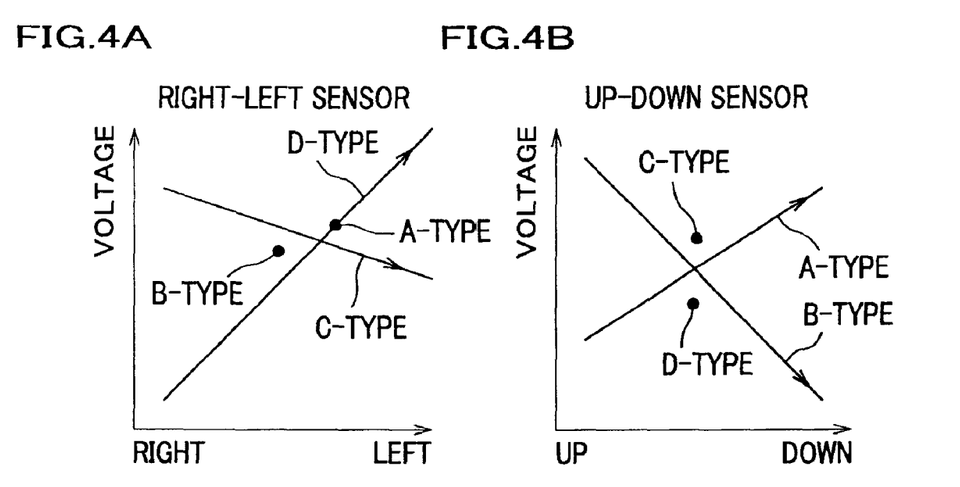
FIGS. 4A and 4B are graphs showing changes in the detection output voltages output from the four types of sensors during the reverse interlocking operation.

The following table 1 shows combinations of changes in the detection output voltages output from the up-down sensor 7 and right-left sensor 8 when a mirror surface is tilted down by the reverse interlocking operation. Each combination of the changes of the detection output voltages corresponds to each of the four types of sensors. FIGS. 4A and 4B are graphs showing changes in the detection output voltages output from the four types of sensors during the reverse interlocking operation.

TABLE 1

Sensor output voltage during the reverse interlocking operation

| TYPE OF SENSORS | RIGHT-LEFT SENSOR | UP-DOWN SENSOR |
|---|---|---|
| A | No change | Up |
| B | No change | Down |
| C | Down | No change |
| D | Up | No change |

As shown in TABLE 1 and FIGS. 4A and 4B, if the output voltage of the up-down sensor 7 increases and the output voltage of the right-left sensor 8 does not change when a mirror surface is tilted down by the reverse interlocking operation, a sensor used can be determined to be the A type sensor.

With the configuration described above, the electric mirror control device is realized in which the controller 1 can automatically differentiate maximum of four types of the up-down sensor 7 and the right-left sensor 8 only by performing the reverse interlocking operation once and thus can absorb the specification difference of the four types of sensors. With the electric mirror control device, the controller 1 does not have to be set in accordance with each specification of the four types of sensors, whereby prevention measures for misplacement are not necessary, and thus the production cost is reduced.

Figure 5:
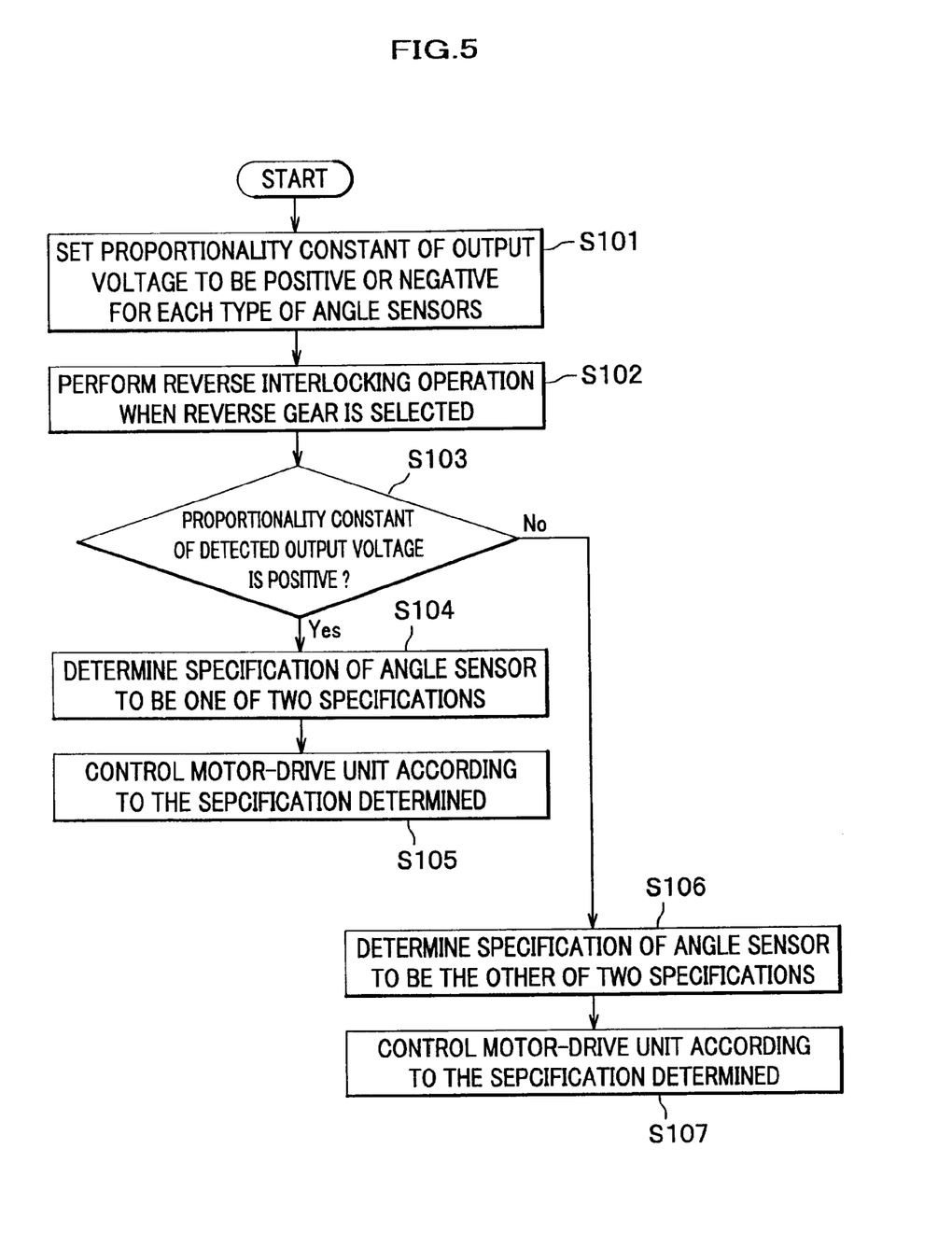
FIG. 5 is a flowchart of an electric mirror control method of the present invention.

An electric mirror control method according to the embodiments is described below with reference to the flowchart of the electric mirror control method shown in FIG. 5. In the following explanation, it is assumed that the first embodiment is employed and there are two types of angle sensors for the convenience of the explanation.

First, a proportionality constant of output voltage of each type of the angle sensors (the up-down sensor 7 and the right-left sensor 8) is set to be positive or negative (step S101: a proportionality constant setting step). This setting is realized by reversing the polarity of voltage applied to the ends of the resistance of the potentiometer of a sensor by using the proportionality constant conversion means 9, or by reversing the polarity of the input terminal of the arithmetic control device or the polarity of the output terminal of a potentiometer.

Second, when a driver selects the reverse gear in a transmission, the arithmetic control unit 13 performs the reverse interlocking operation (step S102: reverse interlocking step).

At this time, the angle-sensor-specification determining function 131 determines the specification of the angle sensor based on whether the change in the detection output voltage output from the up-down sensor 7 (proportionality constant) is in the positive direction or the negative direction (step S103: angle-sensor-specification determining step).

When the proportionality constant of the detection output voltage is positive, the angle-sensor-specification determining function 131 determines the specification of the angle sensor as that of the A type sensor shown in FIG. 2 (step S104). Then, the specification-by-specification control function 132 of the controller 1 controls the right-left motor 5 or the up-down motor 6 based on the specification of the angle sensor (step S105: control step).

When the proportionality constant of the detection output voltage is negative, the angle-sensor-specification determining function 131 determines the specification of the angle sensor as that of the B-type sensor shown in FIG. 2 (step S106). Then, the specification-by-specification control function 132 of the controller 1 controls the right-left motor 5 or the up-down motor 6 based on the specification of the angle sensor (step S107: control step).

With the above steps, because the controller 1 can absorb the difference of a plurality of specifications of angle sensors, it is not necessary to set the controller 1 according to each specification of the up-down sensor 7 and the right-left sensor 8.

The electric mirror control device and the electric mirror control method according to the preferred embodiments described as above are useful for reducing the cost of manufacturing an electrical mirror device having a plurality types of sensors, and the electric mirror control device and the electric mirror control method can be used broadly in the field of automobile industry.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An electric mirror control device, comprising:
at least one angle sensor for detecting an angle of a mirror surface, wherein the angle sensor is selected from a group of angle sensors, with each angle sensor having a different specification, and each of the specifications including a different proportionality constant of a detection output voltage to the angle of the mirror surface;
a control device for controlling a motor-drive unit that tilts the mirror surface and changes the angle of the mirror surface based on the detection output voltage output from the angle sensor; and
a proportionality constant conversion unit for converting the proportionality constant to be positive or negative depending on the specification of the angle sensor, the control device including
an angle-sensor-specification determining function for determining the specification of the angle sensor based on whether the proportionality constant of the detection output voltage output via the proportionality constant conversion unit is positive or negative and
a specification-by-specification control function for controlling the motor-drive unit in accordance with the specification of the angle sensor determined by the angle-sensor-specification determining function from a plurality of specifications stored in advance.

2. The electric mirror control device of claim 1, wherein the angle sensor outputs separately a first detection output voltage for detecting an up-down angle of the mirror surface and a second detection output voltage for detecting a right-left angle of the mirror surface, and
the angle-sensor-specification determining function determines the specification of the angle sensor based on whether the proportionality constant of the first detection output voltage to the up-down angle is positive or negative, or the proportionality constant of the second detection output voltage to the right-left angle is positive or negative.

3. An electric mirror control device, comprising:
at least one angle sensor for detecting an angle of a mirror surface, wherein the angle sensor is selected from a group of angle sensors, with each angle sensor having a different specification, and each of the specifications including a different proportionality constant of a detection output voltage to the angle of the mirror surface;
a control device for controlling a motor-drive unit that tilts the mirror surface and changes the angle of the mirror surface based on the detection output voltage output from the angle sensor; and
a proportionality constant conversion unit for converting the proportionality constant to be positive or negative, the control device including
a reverse interlocking function that allows the motor-drive unit to automatically tilt down the mirror surface when a transmission of a vehicle is shifted to a reverse position and to return the mirror surface to a position before the mirror surface is tilted down when the transmission of the vehicle is shifted to any position other than the reverse position, an angle-sensor-specification determining function for determining the specification of the angle sensor based on whether the proportionality constant of the detection output voltage output via the proportionality constant conversion unit is positive or negative, wherein the angle-sensor-specification determining function determines the specification of the angle sensor based on whether the proportionality constant of the detection output voltage of the angle sensor is positive or negative when the transmission is shifted to the reverse position and the mirror surface is tilted down, and a specification-by-specification control function for controlling the motor-drive unit in accordance with the specification of the angle sensor determined by the angle-sensor-specification determining function from the plurality of specifications stored in advance.

4. The electric mirror control device of claim 2, wherein the control device comprises a reverse interlocking function that allows the motor-drive unit to automatically tilt down the mirror surface when a transmission of a vehicle is shifted to a reverse position and to return the mirror surface to a position before the mirror surface is tilted down when the transmission of the vehicle is shifted to any position other than the reverse position, and the angle-sensor-specification determining function determines the specification of the angle sensor based on whether the proportionality constant of the detection output voltage of the angle sensor is positive or negative when the transmission is shifted to the reverse position and the mirror surface is tilted down.

5. An electric mirror control method for an electric mirror control device comprising at least one angle sensor for detecting an angle of a mirror surface and a control device for controlling a motor-drive unit that tilts the mirror surface and changes the angle of the mirror surface based on a detection output voltage of the angle sensor, the method comprising steps of:

a first step of setting a proportionality constant of the detection output voltage to the angle of the mirror surface to be positive or negative in accordance with a type of the angle sensor;

a second step of performing a reverse interlocking operation that tilts down the angle of the mirror surface when a transmission of a vehicle is shifted to a reverse position and outputting the detection output voltage which detects the angle of the mirror surface;

a third step of determining a specification of the angle sensor based on whether the proportionality constant of the detection output voltage output at the second step is positive or negative; and a fourth step of controlling the motor-drive unit in accordance with the specification of the angle sensor determined at the third step from a plurality of specifications of the angle sensor stored in advance.

* * * * *